Jan. 27, 1959   J. P. MURTAUGH   2,870,667
RETAINING KEY FOR DIPPER TOOTH PARTS HAVING RESILIENT PAD
Filed July 8, 1954                    2 Sheets-Sheet 1
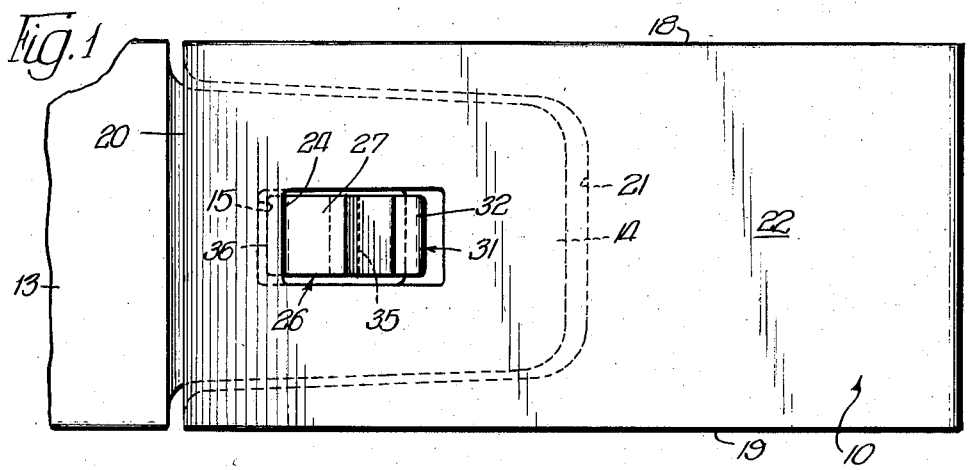
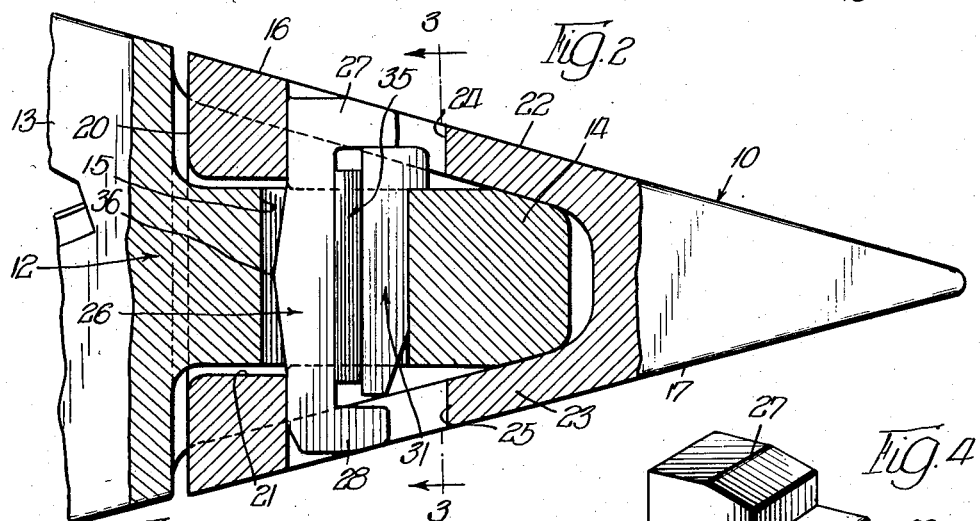
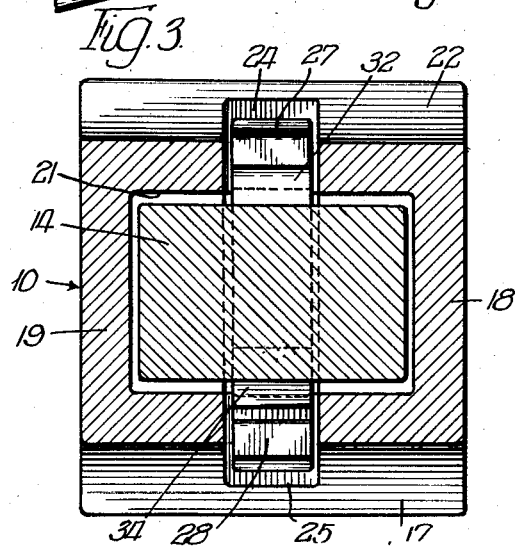
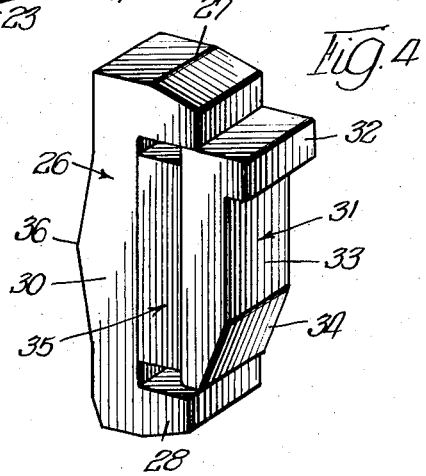
INVENTOR.
Joseph P. Murtaugh,
BY Jan. 27, 1959     J. P. MURTAUGH     2,870,667
RETAINING KEY FOR DIPPER TOOTH PARTS HAVING RESILIENT PAD
Filed July 8, 1954     2 Sheets-Sheet 2
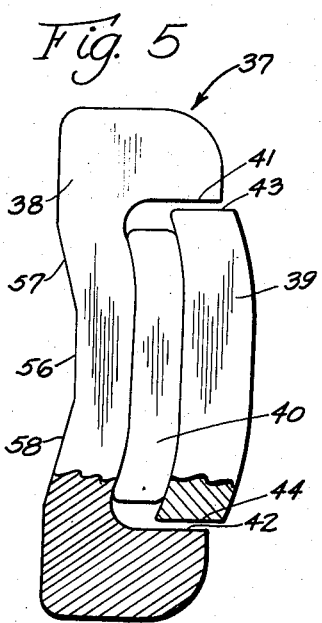
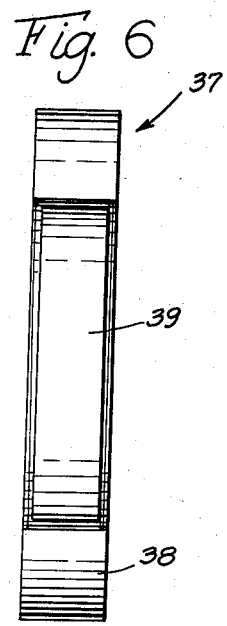
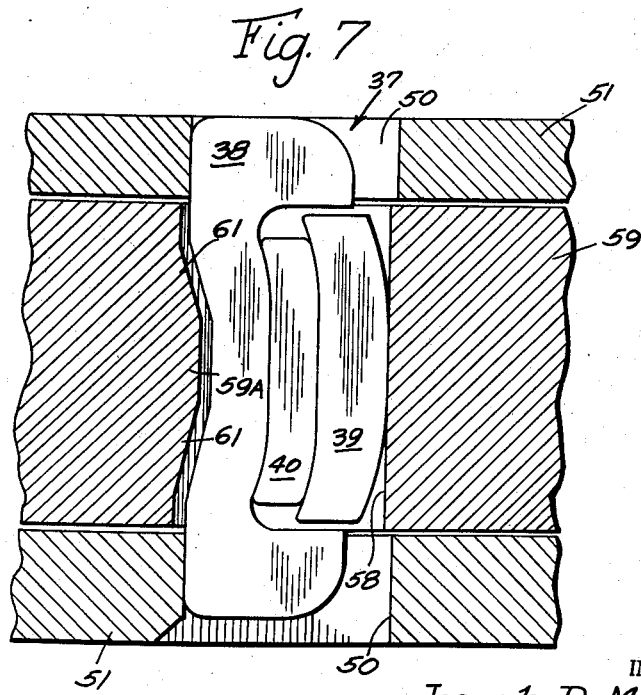
INVENTOR.
Joseph P. Murtaugh.

United States Patent Office 2,870,667
Patented Jan. 27, 1959

2,870,667

RETAINING KEY FOR DIPPER TOOTH PARTS HAVING RESILIENT PAD

Joseph P. Murtaugh, Pacific Palisades, Calif., assignor to American Brake Shoe Company, New York, N. Y., a corporation of Delaware Application July 8, 1954, Serial No. 441,973

2 Claims. (Cl. 85—8.3)

The invention relates generally to the art of replaceable dipper teeth for excavating buckets and has reference more particularly to a retaining member or key of improved construction and design incorporating special features for use in releasably retaining a replaceable dipper tooth in assembled relation on its adapter.

In the construction of dipper teeth for excavating buckets and the like an adapter is provided on which is mounted a replaceable tooth point, the tooth point being locked or retained on the adapter by a retaining member or locking key. The adapter projects forwardly of the digging lip of the bucket and the tooth point is formed with a cavity of special shape for coaction with the adapter whereby the parts interfit with each other and which are retained in interfitting assembled relation by some form of retaining member or key. It is an object of the invention to provide such a retaining or key member which will incorporate improved structural features particularly adapting it for use in releasably securing a dipper tooth in assembled relation on its adapter.

Another object of the invention is to provide a retaining key for maintaining a dipper point in assembled relation on its adapter, wherein the key is inserted in transverse openings which substantially align when the parts are assembled and wherein said key is capable of easy removal to permit changeability as regards the dipper point.

Another object resides in the provision of a retaining key for the purposes described and which will essentially consist of a metal clamp, a metal wedge and a pad of rubber located therebetween, whereby the rubber pad may be compressed upon insertion of the key so as to provide for expansion during usage to take up looseness such as may be caused by wear of the contacting surfaces.

Another object of the invention is to provide a unitary key member as above described wherein the clamp and wedge elements thereof are each formed with a gib head and which have coacting relation during use of the key since the gib head on the clamp element is disposed over and has contact with the gib head on the wedge element.

With these and various other objects in view, the invention may consist of certain novel features of construction and operation, as will be more fully described and particularly pointed out in the specification, drawings and claims appended hereto.

In the drawings which illustrate an embodiment of the invention, and wherein like reference characters are used to designate like parts—

Figure 1 is a top plan view showing a conventional adapter with a box-type dipper point coacting therewith and illustrating use of the retaining or clamping member of the invention for releasably maintaining the parts in assembled relation;

Figure 2 is an elevational view of the adapter and tooth assembly of Figure 1, with parts being shown in section to better illustrate the action of the retaining member in releasably locking the point in assembled relation on the adapter;

Figure 3 is a vertical sectional view taken substantially along line 3—3 of Figure 2;

Figure 4 is a perspective view of a retaining or clamping member embodying the improved features of the invention;

Figure 5 is a side elevational view of another preferred form of clamping member coming within the invention;

Figure 6 is a front elevational view of the clamping member shown in Figure 5; and Figure 7 is a fragmentary view illustrating the clamping member of Figures 5 and 6 inserted in openings in coacting dipper tooth members.

Referring to Figures 1 to 4 inclusive, one embodiment of the invention is illustrated as applied to an adapter and dipper point combination wherein a box-type dipper point generally identified by numeral 10 is assembled on an adapter 12 essentially consisting of base 13 and nose portion 14 which is provided with opening 15. The dipper point 10 is substantially wedge shape when viewed in side elevation, as in Figure 2, and the said point is substantially rectangular when viewed in plan as in Figure 1. Accordingly, the dipper point has exterior surfaces 16 and 17, top and bottom, respectively, which are substantially rectangular, and has exterior side surfaces 18 and 19, which are substantially triangular. The rear surface 20 of the dipper point is formed with a cavity 21, the internal shape of which is complementary to the shape of the nose portion 14 of the adapter. As a result the box-type point has top and bottom walls 22 and 23, respectively, which are perforated to form openings 24 and 25, which substantially align with the opening 15 in the nose portion when the parts are properly assembled as best illustrated in Figure 2.

Instead of using tapered wedges or keys which are conventional for locking the dipper point to its adapter, the invention provides as a substitute therefor an improved retaining or locking key member incorporating novel structural features particularly adapting it for use in connection with replaceable dipper points. The present retaining member is wholly confined within the top and bottom surfaces of the dipper point and an outstanding feature of said member resides in the provision of the pad of resilient material which is compressed upon insertion of the member and is accordingly effective during use to take up wear occurring at the contacting surfaces by reason of its resulting expansion.

The improved retaining key member of the invention is shown in perspective in Figure 4, the same essentially consisting of a main element in the form of a metal clamp 26 substantially C-shape in configuration and providing forwardly extending end portions 27 and 28 which are formed integral with the center section 30. The key additionally includes a coacting element or wedge member 31 having the general shape of an inverted L, with the top forwardly extending end portion 32 thereof being formed integral with the body section 33 and which is bevelled as at 34 at the end opposite portion 32. The retaining key is completed by a pad 35 of resilient material such as rubber, which is interposed between the clamp and wedge members, being vulcanized thereto so that the rubber pad constitutes the sole means connecting the parts and which retains the wedge member to the clamp in proper operative relation therewith. It will be noted that the wedge member 31 has coacting relation with the clamp member 26 since the wedge has location within the end portions 27 and 28. Accordingly, the wedge member has a length less than the distance between the end portions and in operative position the gib head 32 of the wedge member is disposed under and in contact with the gib head 27 of the clamp. The rubber pad 35 may extend the full distance from gib head 27 to bottom portion 28 although, as shown in Figure 4, the pad is somewhat less in height. Also as regards the thickness of the pad, it is realized that the same will vary, depending on the size of the particular retaining key. However, in actual practice, a rubber pad has been employed approximately one-half inch in thickness and upon insertion of the same in a tooth-adapter combination the pad was compressed to a thickness of approximately seven thirty-seconds of an inch.

The end portions 27 and 32 provided on the clamp and wedge members, respectively, can be termed "gib heads," since they function as such, with gib head 27 overlying and contacting gib head 32 for the express purpose of insuring downward inserting movement of both the clamp and the wedge on insertion of the key. Thus, the function of gib head 27 is to transmit motion such as may be applied to it to the wedge member to insure proper inserting movement of both members of the key. The function of gib head 32 is to provide a stop for the key member, thus limiting the inserting action of the key member with respect to the adapter, and properly positioning the member within the dipper point whereby the respective end portions of the clamp will be substantially confined within the top and bottom surfaces of the dipper point.

The retaining key of the invention can be readily removed from the aligned openings in the tooth-adapter combination when it is desired to replace the dipper tooth. When a new tooth is placed on the nose portion 14 of the adapter it is forced to the rear to the maximum extent, which, however, does not completely align the openings 24 and 25 in the top and bottom walls of the dipper tooth with the opening 15 in the nose portion 14 of the adapter. However, said substantially aligned openings are capable of receiving the key 26 of the invention, and the act of inserting the key functions to compress the rubber pad 35 so that eventually the key is properly associated with the respective parts, with the body section 33 of the wedge having contact with the forward part of nose portion 14, and wherein the end portions of the center section 30 of the clamp are in contact with the rear walls of the dipper tooth. It will also be observed that the gib head 27 of the clamp overlies and is in contact with the gib head 32 of the wedge. Accordingly, as the clamp is forced into place by hammer blows applied to the gib head 27 the same will be transmitted to the wedge by reason of the contacting gib heads and all parts of the key are forced into place simultaneously. The inserting action as above described takes place notwithstanding that the parts are independent and are connected only by the rubber pad which is vulcanized to the clamp and wedge. The tapered end 34 of the wedge facilitates the insertion of the key in the substantially aligned openings and the gib head 32 additionally functions as a stop. Inserting movement of the key is limited by reason of the gib head 32, said key being fully inserted when gib head 32 comes into contact with nose portion 14 of the adapter. The protuberance 36 on the rear surface of the center section 30 of the clamp member is provided for the purpose of preventing inadvertent removal of the key. During use of the dipper tooth, wear will take place at the contacting surfaces between tooth and adapter and any looseness such as may develop as a result of such wear is effectively taken up by expansion of the rubber pad.

In Figures 5 and 6 another form of retaining or clamping member 37 for an excavating tooth is shown and which essentially consists of the clamp 38, which is generally C-shape in outline, having associated therewith the arcuate wedge 39, and with a rubber pad such as 40 being located between the clamp and wedge and being bonded to said parts. As best shown in Figure 6, adjacent surfaces at the top and bottom of the wedge are flat. Accordingly, the inside top and bottom surfaces 41 and 42 of the clamp 38 are flat and parallel to the top and bottom surfaces 43 and 44 of the wedge 39. Also it will be noted that the wedge 39 is located substantially within the confines of the clamp 38 so that upon insertion of the clamping member within the substantially aligned openings provided therefor in the parts, it will be seen that movement applied to the clamp will be directly transmitted to the wedge.

The clamping member or retainer key has a special shape and configuration in order to facilitate insertion and retention thereof in aligned openings provided therefor in the coacting parts with which the member 37 is to be used as a retainer. Thus, the clamp part 38 of the retainer 37 is provided with a concavity or depression on the exterior surface thereof characterized by a flat bottom area 56 and sloping adjacent side areas 57 and 58 rendering the depression substantially arcuate. Referring to Figure 7, a key-receiving opening 58 is provided in one of said coacting parts 59, and this opening is provided with a generally arcuate protuberance 59A having sloped sides 61 complementary in shape to the depression and sloped sides 57 and 58 of the key member 37. The other part 51 of said coacting parts is provided with spaced key-receiving openings 50 in opposed walls thereof, and the dimensioning is such that when the parts 51 and 59 are arranged one on the other there is offsetting between the openings 50 and 58 such that the protuberance 59A is partly displaced to the left as viewed in Figure 7 to be partly behind the openings 50.

The clamping member 37 can be inserted by hand into one of the openings 50 and partly into the opening 58 as facilitated by the rounded surfaces at the ends of the clamp and the arcuate outer surface of the wedge, and then the retainer member 37 is impacted by a hammer blow or the like applied to one of the projecting ends of the clamp 38, causing movement of the retainer parts 38 and 39 toward one another and compression of the rubber block as the initially inserted end of the clamping member first engages and then is driven past protuberance 59A. Eventually, the depression in the clamp 38 is directly opposite the protuberance 59A which is the state shown in Figure 7, whereat the part 39 of the retainer member 37 bears against the unyielding internal wall in the member 59 which partly bounds the right-hand side of the opening 58 therein as viewed in Figure 7, and whereat the rear surfaces top and bottom of the clamp 38 bear against the unyielding sides or walls bounding the left-hand extremities of the openings 50, the rubber block being under high compression. Protuberance 59A presents inadvertent displacement of the retainer 37, and accordingly, the coacting parts 51 and 59 which are held in assembled position by the retainer 37 are securely retained and locked with provision being made for expansion of the clamping or retainer member 37 for the necessary takeup or "draw" so that the tooth, as represented by the part 51, will be automatically tightened as wear takes place between it and the related member 59.

It was mentioned that the opposed surfaces 41—43 and 42—44 of the key or retainer 37 are flat and parallel. Additionally, the forwardly projecting portions or heads of the clamp 38 which extend over the ends of the wedge 39 are of substantially identical dimension and configuration as shown in Figure 5 and extend in parallel planes substantially normal to the elongated thick body portion of the clamp 38. The surfaces 43 and 44 of the wedge 39 are in close proximity to the inner surfaces of the projecting heads on the clamp 38, and hence the hammer blow applied to one such head is transmitted almost instantly to the wedge 39. All portions of the rubber block 40 are confined in the recess of the clamp 38 defined by the top and bottom projecting heads thereof, and the ends of this block are inwardly of the surfaces 41 and 42 of the clamp. In rendering the outer face of the wedge 39 substantially arcuate, this is advantageously accomplished by in effect bowing the ends of the wedge 39 to be substantially parallel to the sloped surfaces 57 and 58 of the clamp 38.

Experience has proven that the shank of a dipper tooth will move rearwardly with respect to its bearing surfaces approximately three-sixteenths of an inch during its normal life. Accordingly, it has been necessary in designing the present clamping member to provide for at least three-sixteenths of an inch "draw" or takeup between fully compressed and expanded positions. This feature alone would seem to preclude the possibility of using any type of flexible connection because of the interference or obstruction presented by the offset openings. The present clamping member has been designed to circumvent this obstacle. Actually the configuration which makes it possible to insert the present clamping member in the first place also serves to prevent it from being inadvertently displaced or backed out of the openings regardless of the amount of pressure or lack of pressure on the rubber pad. This can best be illustrated by reference to Figure 7 which shows the position of the parts after usage of the dipper tooth to the extent that a major amount of the "draw" has been taken up. The effectiveness of tapered and flexible connections of the conventional type decreases in proportion to the amount of tension that is taken off the holding member. The connection becomes increasingly loose and will eventually fall out or completely fail. This is especially objectionable in connection with dipper teeth which are not visible to the operator. Should digging continue following release of the clamp the tooth and the excavating bucket might be ruined, necessitating replacement of these expensive parts. In the present clamping member as tension is relieved the locking action of the complementary surfaces becomes more effective.

This application is a continuation-in-part of my copending application Serial No. 336,498, filed February 12, 1953 now issued as U. S. Patent No. 2,772,492.

The invention is not to be limited to or by details of construction of the particular embodiment thereof illustrated by the drawings, as various other forms of the device will of course be apparent to those skilled in the art without departing from the spirit of the invention or scope of the claims.

What is claimed is:

1. In a retaining key member insertable in a key-receiving opening of an assembly of dipper tooth parts, a substantially C-shaped clamp having an elongated body with spaced apart upper and lower forwardly projecting portions at the respective ends thereof, said projections thus defining a recess on the forward side of said elongated body and the upper one of said projections constituting a gib head adapted to be impacted by a hammer blow, an elongated wedge member of generally inverted L-shape disposed in said recess, said wedge member having at the upper end thereof a forwardly projecting portion constituting a gib head, the forwardmost portions of said wedge gib head extending forwardly beyond the forwardmost end of the clamp gib head and the rearward portions of the wedge gib head being disposed under and in alignment with the clamp gib head in closely spaced proximity thereto so that such hammer blow delivered to the clamp gib head is transmitted directly and substantially instantaneously to the wedge gib head, an elongated pad of resilient material interposed between opposed surfaces of said clamp and wedge and having the longitudinal axis thereof disposed parallel to the longitudinal axes of said clamp and wedge, all portions of said resilient pad being completely confined within said recess, said resilient pad being placed under compression during insertion of said key in said key-receiving opening, the lower end of said wedge opposite the gib head thereof being disposed above and in alignment with an opposed surface of the lower projection on said clamp, whereby a hammer blow delivered to the lower projection of said clamp is transmitted directly to the lower end of said wedge, the forward face of the wedge at lower end portions thereof being bevelled rearwardly in a downwardly proceeding direction to facilitate entry of the key into said key-receiving opening, and the rear face of said body having an angled rearwardly extended protuberance formed thereon between the opposed ends thereof to cooperate with a complemental recess in one of the dipper tooth parts inwardly of said key-receiving opening to prevent displacement of the key from said key-receiving opening.

2. In an integral three-part retaining key member insertable in a key-receiving opening of an assembly of dipper tooth parts, a substantially C-shaped one-piece clamp part having an elongated solid thick body portion with a rear surface and a front surface and with spaced apart upper and lower substantially identically sized and dimensioned and configured forwardly projecting portions at the respective ends thereof extended forwardly beyond the front surface of said body portion and in substantially parallel planes disposed normal to the plane of said body portion, said projections thus embracing a forwardly opening recess on the front side of said elongated body and said projections constituting heads each having flat outer surfaces adapted either one to be impacted by a hammer blow and each having substantially flat uninterrupted monoplanar inner surfaces facing toward one another in wide apart spaced relation and defining with the front surface of the body portion of the clamp part the limits of said recess, an elongated solid thick one-piece wedge member of substantially uniform thickness throughout having opposed flat front and rear surfaces and opposed substantially flat uninterrupted end walls disposed in said recess beneath said heads and with the opposed end walls of said wedge disposed substantially parallel to said mono-planar surfaces in close proximity thereto, an elongated thick solid one-piece pad of compressible resilient material having a substantially uniform thickness throughout interposed between the front surface of said clamp part and the opposed rear surface of said wedge and vulcanized thereto as the sole connection between the clamp part and the wedge and the resilient pad, said resilient pad having the longitudinal axis thereof disposed parallel to the longitudinal axes of said clamp part and said wedge, all portions of said resilient pad being confined within said recess and the two ends of said pad each being respectively spaced inwardly of said mono-planar surfaces and the front surface of said wedge projecting beyond the forwardmost surfaces of said heads and the projecting heads of said clamp part extending over portions at least of the ends of said wedge but not extending substantially forwardly of the front surface of said wedge in the normal uncompressed state of said pad, said resilient pad being placed under compression during insertion of said key member in said key-receiving opening by virtue of the rear surface of the clamp part engaging one unyielding surface of the dipper tooth assembly defining said key-receiving opening and the front surface of the wedge engaging another unyielding surface of the dipper tooth assembly defining the remainder of said key receiving opening, the opposite end portions of the front surface of said wedge being gradually bent rearwardly proceeding from the front of the wedge to the rear of the wedge, and ends of the body portion of the clamp part being bent substantially parallel to said bent portions of the wedge to afford oppositely angled surfaces between the opposed ends of the clamp part at the rear surface thereof and which oppositely angled surfaces are adapted to be associated with complementally angled surfaces in one of the dipper tooth parts defining said key-receiving opening as aforesaid to maintain the retaining key member in place within said key-receiving opening.

References Cited in the file of this patent

UNITED STATES PATENTS

| | | |
|---|---|---|
| 2,259,456 | Crawford | Oct. 21, 1941 |
| 2,279,960 | Terry | Apr. 14, 1942 |
| 2,483,032 | Baer | Sept. 27, 1949 |
| 2,568,075 | Launder | Sept. 18, 1951 |
| 2,702,490 | Launder | Feb. 22, 1955 |
| 2,772,492 | Murtaugh | Dec. 4, 1956 |